US008014888B2

(12) United States Patent
della-Porta

(10) Patent No.: US 8,014,888 B2
(45) Date of Patent: Sep. 6, 2011

(54) METHODS AND SYSTEMS FOR CUSTOMIZING LIGHTING CONTROL PANELS

(75) Inventor: Louis della-Porta, Skipton (GB)

(73) Assignee: Cooper Technologies Company, Houston, TX (US)

( * ) Notice: Subject to any disclaimer, the term of this patent is extended or adjusted under 35 U.S.C. 154(b) by 295 days.

(21) Appl. No.: 12/463,582

(22) Filed: May 11, 2009

(65) Prior Publication Data

US 2010/0286810 A1 Nov. 11, 2010

(51) Int. Cl.
*G06F 19/00* (2006.01)
*B29C 45/14* (2006.01)

(52) U.S. Cl. ............ 700/117; 700/97; 700/98; 700/118; 700/163; 264/510; 264/512; 264/515; 264/516

(58) Field of Classification Search ............. 700/97–98, 700/117–118, 163, 182; 264/510, 512, 515–516
See application file for complete search history.

(56) References Cited

U.S. PATENT DOCUMENTS

| | | | | |
|---|---|---|---|---|
| D183,395 S | | 8/1958 | Koch | |
| D297,405 S | | 8/1988 | Yandek et al. | |
| D311,678 S | | 10/1990 | Graef et al. | |
| 5,101,352 A | * | 3/1992 | Rembert | 705/7.26 |
| 5,202,837 A | * | 4/1993 | Coe et al. | 700/98 |
| 5,357,439 A | * | 10/1994 | Matsuzaki et al. | 700/96 |
| D378,814 S | | 4/1997 | Adams et al. | |
| D412,491 S | | 8/1999 | Mayo et al. | |
| D422,567 S | | 4/2000 | Mayo et al. | |
| D436,930 S | | 1/2001 | Butler | |
| D456,783 S | | 5/2002 | Mayo et al. | |
| 7,414,210 B2 | * | 8/2008 | Clegg et al. | 200/314 |
| 2009/0093901 A1 | * | 4/2009 | Awile et al. | 700/97 |
| 2009/0263624 A1 | * | 10/2009 | Illston | 428/131 |
| 2009/0276070 A1 | * | 11/2009 | Burkes et al. | 700/98 |
| 2010/0125356 A1 | * | 5/2010 | Shkolnik et al. | 700/98 |

OTHER PUBLICATIONS http://www.lutron.com/hlc/ (Aug. 26, 2005).
http://www.crestron.com/features/applications/home/ (Dec. 4, 2005).
http://www.edionline.com/products.htm (Mar. 19, 2006).
http://www.etcconnect.com/home.aspx?lang=us&region=1 (Dec. 4, 2007).
http://www.huntdimming.com/wallbox.html (Sep. 18, 2007).
http://www.lolcontrols.com/ (Feb. 1, 2008).

* cited by examiner

*Primary Examiner* — Ramesh B Patel
(74) *Attorney, Agent, or Firm* — King & Spalding LLP

(57) ABSTRACT

A design module is a software module that is implemented in a computer system that comprises instructions stored in a machine-readable medium and a processor that executes the instructions. The design module receives inputs from a person to create a custom insert for a lighting control panel. The inputs identify the content and locations of labels and a decorative background of the insert. Each label is associated with a corresponding input device. Each input device is associated with an optical configuration or "scene" of an environment associated with the lighting control panel. Each label includes alphanumeric text and/or graphics that identify the scene of the label's corresponding input device. The design module causes the insert to be generated by instructing a printer to print the labels and background on a sheet of material, at the specified locations.

14 Claims, 4 Drawing Sheets

200

METHODS AND SYSTEMS FOR CUSTOMIZING LIGHTING CONTROL PANELS

TECHNICAL FIELD

The invention relates generally to lighting control panels and, more particularly, to methods and systems for customizing the content, design, and overall "look and feel" of lighting control panels and labels thereof.

BACKGROUND

A lighting control panel is an electronic device used to control one or more other electronic devices, such as luminaires and light shades, that affect light in an environment. A luminaire is a system that outputs or distributes light into an environment, thereby allowing certain items in that environment to be visible. Luminaires are often referred to as "light fixtures." A lighting control panel can be used to change an optical configuration and an intensity of light emitted by luminaires associated with the lighting control panel. For example, a person can use a lighting control panel to select one of a variety of different predefined optical configurations or "scenes" and to adjust intensity of light within a selected scene. Typically, lighting control panels are wall-mounted devices positioned where a conventional "on/off" switch would be.

Lighting control panels include labels that identify each scene available for selection. For example, a lighting control panel in an educational environment can include labels for "general," "meeting," "seminar," and "lecture" scenes. Traditionally, the labels are static in that, once they are created, they cannot be changed. For example, each label may be permanently etched or printed on a button, insert, cover, or other portion of the lighting control panel. Similarly, the overall design and "look and feel" of a traditional lighting control panel is static.

The static nature of traditional lighting control panels and the labels thereof is problematic because designs and functions of environments associated with the traditional lighting control panels are inherently dynamic. For example, on a given day, a multi-purpose room or other environment may be used for a variety of different activities. Each activity may be associated with a different environmental design and may require a different set of lighting scenes. For example, a room may require a conservative environmental design when it is used for a meeting of international businessmen, and it may require a fun, party-type design when it is used for a wedding reception.

Therefore, a need currently exists in the art for methods and systems for customizing lighting control panels. In particular, a need exists in the art for methods and systems for customizing the content, design, and overall "look and feel" of lighting control panels and labels thereof.

SUMMARY

The invention provides methods and systems for customizing lighting control panels. A design module is a software module that is implemented in a computer system that comprises instructions stored in a machine-readable medium and a processor that executes the instructions. The design module can be executed on a local computer or a remote computer or server that communicates with a local computer via a network. For example, a person can access the design module via an Internet-based web application.

The design module receives inputs from the person to create a custom insert for a lighting control panel. The lighting control panel includes at least one input device. Each input device is associated with a different scene or optical configuration for an environment that is associated with the lighting control panel. The lighting control panel is configured to control one or more other electronic devices in the environment. The lighting control panel responds to input received at each input device by controlling the other electronic devices to cause the environment to have the optical configuration associated with the input device. For example, each input device can include a button, capacitive touch switch, or other device that receives inputs from a person.

A front cover is disposed over at least a portion of the input devices. The insert is disposed between the front cover and the input devices. The insert includes one or more labels that are each associated with one of the input devices. The insert also includes a decorative background, such as a color, graphic, or textual figure, that accompanies the labels. The front cover includes a transparent or semi-transparent material through which at least a portion of the labels and the background is visible.

The labels and background of the insert are custom-designed using the design module. The design module receives at least one first input, with each first input identifying content for one of the labels. For example, the content can include alphanumeric text and/or graphics. The design module also receives at least one second input, with each second input identifying a location on the insert for a corresponding one of the labels. In certain exemplary embodiments, the design module receives the first and second inputs in response to prompts displayed by the design module on a graphical user interface.

The design module causes the insert to be generated, with each label including its designated content and being located at its identified location. For example, the design module can cause the insert to be generated by instructing a locally or remotely located printer to print the labels on a sheet of material, such as plastic. Prior to the time of printing, the sheet of material may be blank or may include one or more preprinted backgrounds or labels. A person can install the generated insert in a lighting control panel by removing the front cover of the lighting control panel, removing any insert present in the lighting control panel, replacing the removed insert with the generated insert, and replacing the front cover.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the present invention and the advantages thereof, reference is now made to the following description, in conjunction with the accompanying figures briefly described as follows.

DETAILED DESCRIPTION OF EXEMPLARY EMBODIMENTS

The following description of exemplary embodiments refers to the attached drawings, in which like numerals indicate like elements throughout the figures.

Figure 1:
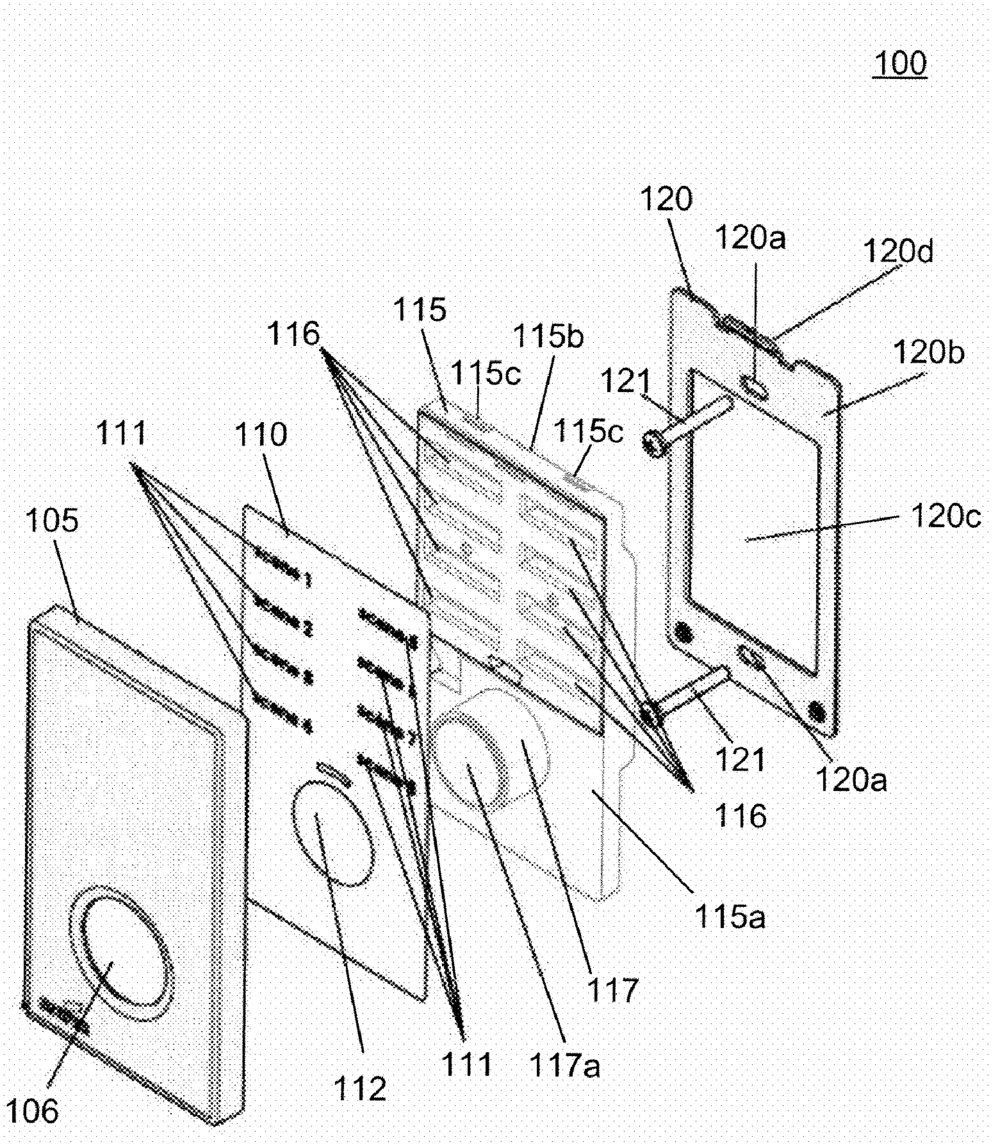
FIG. 1 is an exploded view of a lighting control panel, in accordance with certain exemplary embodiments.

FIG. 1 is an exploded view of a lighting control panel 100, in accordance with certain exemplary embodiments. The lighting control panel 100 is an electronic device used to control one or more other electronic devices (not shown), such as luminaires and window shades. Typically, the lighting control panel 100 is used to adjust at least one optical characteristic in a corresponding environment. For example, a person can use the lighting control panel 100 to adjust a configuration and/or an intensity of light in the environment. For simplicity, the term "controlled device" is used herein to refer to any electronic device that is controlled by a lighting control panel 100.

The lighting control panel 100 includes a main body 115 that includes circuitry through which control signals are transferred between the lighting control panel 100 and one or more controlled devices. Switches 116 disposed at least partially on a front face 115*a* of the main body 115 are associated with various predefined configurations of the controlled devices. For example, each configuration or "scene" can be associated with a different light configuration within an environment associated with the controlled devices. Each switch 116 is associated with one scene. In certain exemplary embodiments, each switch 116 is at least partially illuminated by one or more diodes or other light-emitting elements disposed within the main body 115.

A person can select a particular scene by activating the switch 116 associated with that scene. For example, each switch 116 can include a button, capacitive touch switch, or other device that receives inputs from a person. The circuitry within the main body 115 is electrically coupled to the switch 116 and is responsive to inputs thereto. Activation of a particular switch 116 causes the circuitry to transfer control signals between the switch 116 and one or more of the controlled devices. For example, activation of a switch 116 associated with a scene that requires bright lighting may cause control signals to activate one or more luminaires and/or raise one or more light shades.

A knob 117 disposed on the front face 115*a* of the main body 115 is operable to turn the lighting control panel 100 on and off and to adjust intensity of light in a selected scene. For example, a person can depress the knob 117 to turn the lighting control panel 100 on and off and rotate the knob 117 clockwise and counterclockwise to increase and reduce the intensity of light in a selected scene. The knob 117 is electrically coupled to the circuitry within the main body 115 such that operation of the knob 117 causes control signals to be transferred between the knob 117 and one or more of the controlled devices.

The main body 115 is configured to be coupled to a standard electrical wall box (not shown) via a chassis plate 120. The chassis plate 120 includes two apertures 120*a* through which fastening devices, such as screws 121, secure the chassis plate 120 to the wall box. A frame 120*b* of the chassis plate 120 defines an interior opening 120*c* through which at least a portion of a back side 115*b* of the main body 115 extends into the wall box. The main body 115 is removably secured to the chassis plate 120 via one or more tabs, slots, lips 120*d*, screws, bolts, or other fastening means. Similarly, a front cover 105 is removably secured to the main body 115 via one or more tabs, slots 115*c*, lips, screws, bolts, or other fastening means.

A control panel insert 110 is disposed between the front cover 105 and the main body 115. The control panel insert 110 is held in place by being essentially "sandwiched" between the front cover 105 and the main body 115. Alternatively, the control panel insert 110 may be removably coupled to the front cover 105 and/or the main body 115 via one or more tabs, slots, lips, screws, bolts, or other fastening means. Openings 106 and 112 in the front cover 105 and the control panel insert 110, respectively, accommodate at least a portion of the knob 117 so that at least a front end 117*a* of the knob 117 is disposed along an outer periphery of the control panel 100.

The control panel insert 110 is a sheet of material, such as plastic, that includes labels 111 identifying the scenes associated with the switches 116. Each label 111 is associated with a different scene. For example, each label 111 can include text or graphics identifying its associated scene. Each label 111 is disposed proximate its corresponding switch 116. For example, each label 111 may cover or engage at least a portion of its corresponding switch 116. In certain exemplary embodiments, the labels 111 are transparent or semi-transparent so that the light illuminating each switch 116 illuminates one or more of the labels 111. The light can illuminate all of the labels 111 or only the label 111 corresponding to the scene that is currently active.

As set forth below, the content, design, and overall "look and feel" of the lighting control panel 100 can be customized using different control panel inserts 110. In particular, a person can interchange different control panel inserts 110 within the lighting control panel 100 to adjust the content, design, and "look and feel" of the lighting control panel 100. Each control panel insert 110 can be custom-designed to include desired content, such as custom text and graphics. For example, each control panel insert 110 can include a decorative background and labels 111 that have been custom-designed for a particular environment or event.

Figure 2:
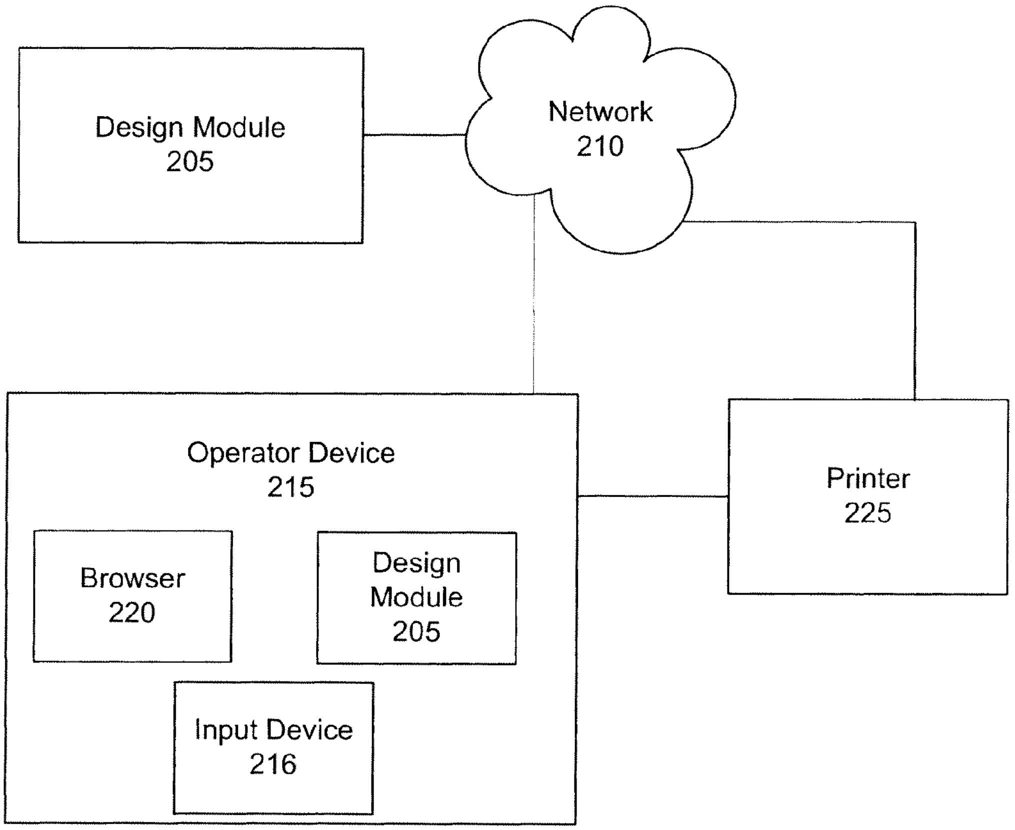
FIG. 2 is a block diagram depicting a system for customizing lighting control panels, in accordance with certain exemplary embodiments.
Figure 3:
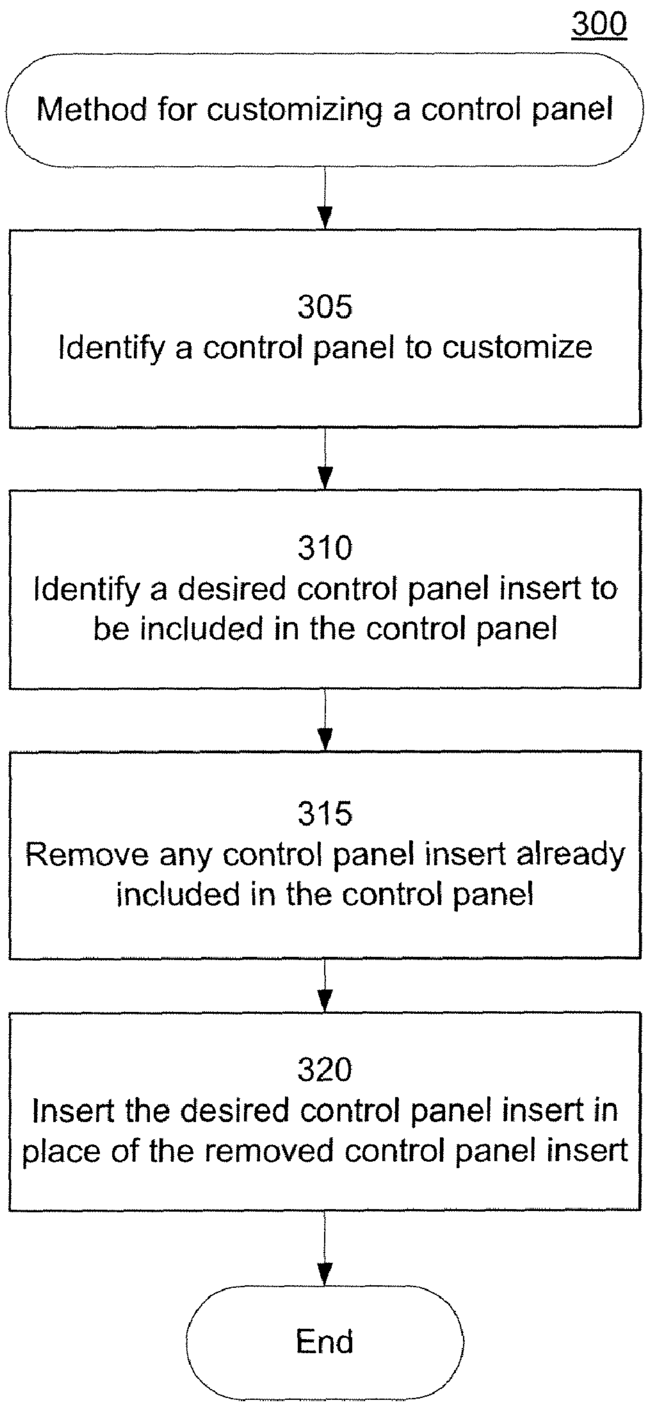
FIG. 3 is a flow chart depicting a method for customizing lighting control panels, in accordance with certain exemplary embodiments.

FIG. 2 is a block diagram depicting a system 200 for customizing lighting control panels 100, in accordance with certain exemplary embodiments. The system 200 is described hereinafter with reference to the methods 300 and 400 illustrated in FIGS. 3 and 4. FIG. 3 is a flow chart depicting a method 300 for customizing lighting control panels, in accordance with certain exemplary embodiments. The exemplary method 300 is illustrative and, in alternative embodiments of the invention, certain steps can be performed in a different order, in parallel with one another, or omitted entirely, and/or certain additional steps can be performed without departing from the scope and spirit of the invention. The method 300 is described hereinafter with reference to FIGS. 1-3.

In step 305, a person identifies a control panel 100 to customize. In step 310, the person identifies a desired control panel insert 115 to be included in the control panel 100. For example, the person can identify the control panel insert 115 from a group of one or more existing control panel inserts 115. Alternatively, this step 310 may involve generating a new control panel insert 115 that includes desired content. An exemplary method 400 for generating a new, customized control panel insert 115 is described below, with reference to FIG. 4.

In step 315, the person removes any control panel insert 115 present in the control panel 100. To remove the control panel insert 115, the person removes the cover 105 from the main body 115 and then separates the control panel insert 115 from the main body 115. For example, the person can remove the cover 105 by disabling one or more tabs, slots, lips, screws, bolts, or other fastening means holding the cover 105 to the main body 115. In step 320, the person replaces the removed control panel insert 115 with the desired control panel insert 115 identified in step 310. The person also replaces the removed front cover 105 to complete the re-assembly of control panel 100.

Figure 4:
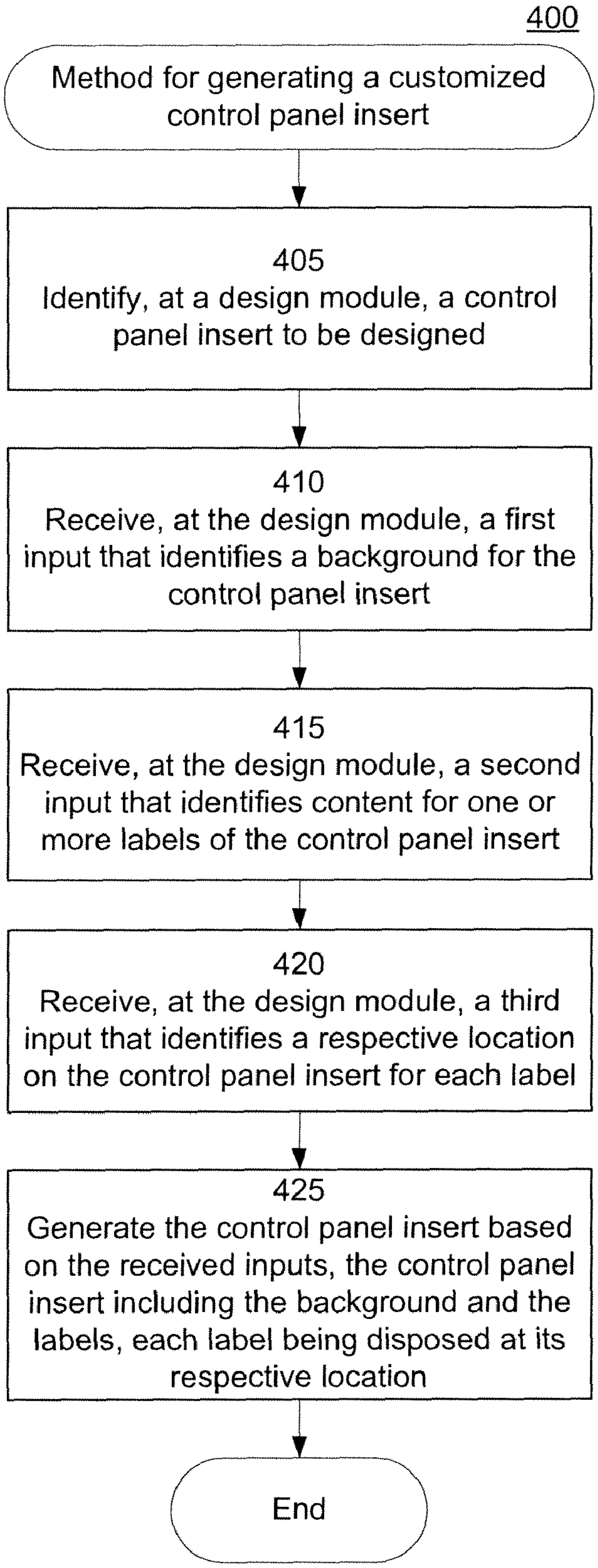
FIG. 4 is a flow chart depicting a method for generating custom control panel inserts, in accordance with certain exemplary embodiments.

FIG. 4 is a flow chart depicting a method 400 for generating custom control panel inserts, in accordance with certain exemplary embodiments. The exemplary method 400 is illustrative and, in alternative embodiments of the invention, certain steps can be performed in a different order, in parallel with one another, or omitted entirely, and/or certain additional steps can be performed without departing from the scope and spirit of the invention. The method 400 is described hereinafter with reference to FIGS. 1-4.

In step 405, a design module 205 identifies a control panel insert 115 to be designed. The design module 205 is a computer program that includes instructions executed in a computer system. In certain exemplary embodiments, the design module 205 is stored and executed on an operator device 215. The operator device 215 is a computing device, such as a personal computer, that includes a processor configured to execute the instructions of the design module 205. The operator device 215 also includes at least one input device 216 through which a person can enter commands and information to the operator device 215. For example, the input device(s) 216 can include a keyboard, mouse, trackball, electronic pen, touch screen, microphone, joystick, or the like.

In certain exemplary embodiments, the design module 205 is stored remotely from the operator device 215 and is in communication with the operator device 215 via a network 210. The network 210 includes any wired or wireless telecommunication means by which computerized devices can exchange data, including, for example, a local area network (LAN), a wide area network (WAN), an intranet, an Internet, or any combination thereof. In certain exemplary embodiments, a person operating the operator device 215 can access the design module 205 over the network 210 via web browser application software 220 of the operator device 215. Thus, the design module 205 is accessible directly on the operator device 215 or indirectly via the network 210.

In step 410, the design module 205 receives a first input that identifies a background for the control panel insert 115. The background is an image or color displayed on at least a portion of the control panel insert 115, substantially behind at least one of the labels 111. The first input is provided to the design module 205 based on input entered via one or more of the input devices 216. For example, the first input can be based on a typed entry or mouse-clicked selection of at least one background option.

In certain exemplary embodiments, the background options can include previously created backgrounds stored in a computer memory coupled to the design module 205, as well as newly created backgrounds generated with assistance by the design module 205. For example, the background options can include a background uploaded from a memory of the operator device 215. In certain exemplary embodiments, a person provides the first input in response to one or more prompts displayed on a graphical user interface associated with the design module 205. For example, the graphical user interface can include a check box, drop-down box, text entry field, or other prompt identifying one or more available background options.

In step 415, the design module 205 receives a second input that identifies content for at least one label 111 of the control panel insert 115. For example, for each label 111, the second input can identify text and/or graphics to be included in the label 111. The second input is provided to the design module 205 based on input entered via one or more of the input devices 216. For example, the second input can be based on a typed entry or a mouse-clicked selection of at least one label option.

In certain exemplary embodiments, the label options can include previously created labels stored in a computer memory coupled to the design module 205, as well as newly created labels generated with assistance by the design module 205. For example, the label options can include text or graphics uploaded from a memory of the operator device 215. In certain exemplary embodiments, a person provides the second input in response to one or more prompts displayed on a graphical user interface associated with the design module 205. For example, the graphical user interface can include a text entry field in which a person can type desired text, as well as a check box, drop-down box, text entry field, or other prompt identifying one or more available label options.

In step 420, the design module 205 receives a third input that identifies a respective location on the control panel insert 115 for each label 111. For example, the third input can identify the switch 116 to which each label 111 will correspond. The third input is provided to the design module 205 based on input entered via one or more of the input devices 216. For example, the third input can be based on a typed entry or a mouse-clicked selection of at least one location. In certain exemplary embodiments, a person provides the third input in response to one or more prompts displayed on a graphical user interface associated with the design module 205. For example, the graphical user interface can include a check box, drop-down box, text entry field, or other prompt identifying one or more available locations. In certain exemplary embodiments, the graphical user interface displays an image of a control panel insert 115 on which the prompts are disposed. For example, a person can select a location for a particular label 111 by clicking on a desired location on the image and then entering text for the label 111 via a keyboard or other input device 116.

In step 425, the design module 205 generates the control panel insert 115 based on the inputs received in steps 410-420. In certain exemplary embodiments, the design module 205 generates the control panel insert 115 by causing a printer 225 to print the background and/or the labels 111 on a sheet of material. Each label 111 is disposed at the location identified in the third input received in step 420.

The printer 225 is connected directly or indirectly (via the network 210) to the operator device 215 and/or the design module 205. In certain exemplary embodiments, the printer 225 is associated with a person other than the person using the operator device 215. For example, the printer 225 can be associated with a manufacturer or other entity that prepares the control panel insert 115 on behalf of the person using the operator device 215. Alternatively, the person using the operator device 215 can prepare the control panel insert 115 himself.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A method for generating a custom insert for a light control panel, comprising the steps of:

receiving, at a design module, at least one first input, each first input identifying content for a label of an insert of a light control panel, the light control panel being associated with an environment, the light control panel comprising:

a front cover comprising a material that is at least partially transparent;

at least one input device, each input device being associated with a respective optical configuration for the environment; and the insert disposed between the front cover and the input devices;

receiving, at the design module, at least one second input, each second input identifying a location on the insert for a corresponding one of the labels; and the design module causing the insert to be generated, the insert comprising a sheet of material on which each label is disposed at its identified location, each label being associated with, and identifying the optical configuration associated with, a respective one of the input devices, each label being visible through the front cover, wherein the light control panel is configured to respond to input received at each input device by controlling each electronic device to cause the environment to have the optical configuration associated with the input device, wherein the design module is implemented in a computer system that comprises instructions stored in a machine-readable medium and a processor that executes the instructions.

2. The method of claim 1, wherein the step of causing the insert to be generated comprises the step of instructing a printer to print the labels on the sheet of material.

3. The method of claim 1, further comprising the step of receiving, at the design module, a third input that identifies a background for the insert.

4. The method of claim 3, wherein the background comprises at least one of an image and a color.

5. The method of claim 1, wherein at least one of the input devices comprises a capacitive touch switch.

6. The method of claim 1, wherein the content for each label comprises at least one of text and a graphic.

7. The method of claim 1, further comprising the step of displaying a graphical user interface comprising a prompt, wherein at least one of the first inputs is received in response to the prompt.

8. A method for customizing a "look and feel" of a light control panel, comprising the steps of:

identifying a light control panel to be customized, the light control panel comprising:

a front cover comprising a material that is at least partially transparent;

at least one input device, each input device being associated with a respective optical configuration for an environment that is associated with the light control panel; and a first insert disposed between the front cover and the input devices;

generating a second insert by:

receiving, at a design module, at least one first input, each first input identifying content for a label of the second insert, each label being associated with, and identifying the optical configuration associated with, a respective one of the input devices;

receiving, at the design module, at least one second input, each second input identifying a location on the second insert for a corresponding one of the labels; and the design module instructing a printer to print the labels on a sheet of material, at the identified locations; and replacing the first insert with the second insert, each label on the second insert being visible through the front cover, wherein the light control panel is configured to respond to input received at each input device by controlling each electronic device to cause the environment to have the optical configuration associated with the input device, wherein the design module is implemented in a computer system that comprises instructions stored in a machine-readable medium and a processor that executes the instructions.

9. The method of claim 8, wherein the step of generating the second insert further comprises the step of receiving, at the design module, a third input that identifies a background for the second insert.

10. The method of claim 9, wherein the background comprises at least one of an image and a color.

11. The method of claim 8, wherein at least one of the input devices comprises a capacitive touch switch.

12. The method of claim 8, wherein the content for each label comprises at least one of text and a graphic.

13. The method of claim 8, wherein the step of generating the second insert further comprises the step of displaying a graphical user interface comprising a prompt, wherein at least one of the first inputs is received in response to the prompt.

14. The method of claim 8, wherein the step of replacing the first insert with the second insert comprises the steps of:

repositioning the front cover from a closed position to an open position;

removing the first insert;

replacing the removed first insert with the second insert; and repositioning the front cover from the open position to the closed position.

* * * * *